United States Patent
Naamad et al.

(10) Patent No.: US 10,203,887 B1
(45) Date of Patent: Feb. 12, 2019

(54) RECOMMENDATION SYSTEM AND METHOD

(71) Applicant: EMC Corporation, Hopkinton, MA (US)

(72) Inventors: Amnon Naamad, Brookline, MA (US); Brad Maltz, Douglas, MA (US); Kuram T. Narayana, Cupertino, CA (US); Ron Bigman, Holon (IL); Anurag S. Maunder, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 14/674,808

(22) Filed: Mar. 31, 2015

(51) Int. Cl.
*G06F 3/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ..... G06F 3/0619; G06F 3/0665; G06F 3/0689
See application file for complete search history.

(56) References Cited

U.S. PATENT DOCUMENTS

| | | | | |
|---|---|---|---|---|
| 6,779,030 B1 * | 8/2004 | Dugan | ............ | H04M 3/42136 379/221.08 |
| 6,978,259 B1 * | 12/2005 | Anderson | ............ | G06F 3/0605 706/19 |
| 7,139,741 B1 * | 11/2006 | Benjamin | ............ | G06N 5/04 706/45 |
| 7,197,559 B2 * | 3/2007 | Goldstein | ............ | G06F 11/323 709/224 |
| 7,640,342 B1 * | 12/2009 | Aharoni | ............ | G06F 3/0605 370/237 |
| 8,151,048 B1 * | 4/2012 | Premkumar | ......... | G06F 3/0605 710/305 |
| 8,255,803 B1 * | 8/2012 | McAdam | ............ | G06F 3/0605 711/114 |
| 8,433,848 B1 * | 4/2013 | Naamad | ............ | G06F 3/0605 711/114 |
| 8,473,678 B1 * | 6/2013 | Rajasekaran | ......... | G06F 3/0605 711/114 |
| 8,504,689 B2 * | 8/2013 | Ferris | .................... | G06F 9/5072 709/226 |
| 8,566,546 B1 * | 10/2013 | Marshak | ............ | G06F 3/0604 711/112 |

(Continued)

OTHER PUBLICATIONS

Alvarez, Guillermo A., et al. "Minerva: An automated resource provisioning tool for large-scale storage systems." ACM Transactions on Computer Systems (TOCS) 19.4 (2001): 483-518.*

(Continued)

*Primary Examiner* — Francisco A Grullon
(74) *Attorney, Agent, or Firm* — Brian J. Colandreo; Mark H. Whittenberger; Holland & Knight LLP

(57) ABSTRACT

A method, computer program product, and computing system for defining one or more computing system requirements for desired data storage array. One or more design criteria is defined for the desired data storage array. At least one recommended data storage array is identified for the desired data storage array based, at least in part, upon the one or more computing system requirements and the one or more design criteria.

15 Claims, 3 Drawing Sheets

(56) References Cited

U.S. PATENT DOCUMENTS

| | | | | |
|---|---|---|---|---|
| 9,052,952 | B1* | 6/2015 | Chopra | G06F 9/5005 |
| 2002/0059274 | A1* | 5/2002 | Hartsell | H04L 41/0803 |
| 2002/0065864 | A1* | 5/2002 | Hartsell | H04L 41/5009 |
| | | | | 718/100 |
| 2002/0174004 | A1* | 11/2002 | Wagner | G06Q 10/04 |
| | | | | 705/7.25 |
| 2004/0230317 | A1* | 11/2004 | Kumar | G06F 3/0605 |
| | | | | 700/1 |
| 2005/0066239 | A1* | 3/2005 | Keeton | G06F 11/008 |
| | | | | 714/47.1 |
| 2005/0273556 | A1* | 12/2005 | Gellai | G06F 3/0607 |
| | | | | 711/114 |
| 2006/0031508 | A1* | 2/2006 | Gellai | G06F 3/0605 |
| | | | | 709/226 |
| 2011/0213761 | A1* | 9/2011 | Song | G06F 17/30867 |
| | | | | 707/706 |
| 2012/0042055 | A1* | 2/2012 | Agarwala | G06F 9/5061 |
| | | | | 709/220 |
| 2013/0055249 | A1* | 2/2013 | Vaghani | G06F 3/0617 |
| | | | | 718/1 |
| 2013/0097321 | A1* | 4/2013 | Tumbde | H04L 67/1008 |
| | | | | 709/226 |
| 2013/0111221 | A1* | 5/2013 | Fujii | G06F 3/0604 |
| | | | | 713/193 |
| 2013/0111471 | A1* | 5/2013 | Chandrasekaran | G06F 9/455 |
| | | | | 718/1 |
| 2013/0198449 | A1* | 8/2013 | Belluomini | G06F 3/0604 |
| | | | | 711/114 |
| 2014/0006731 | A1* | 1/2014 | Uluski | G06F 3/0604 |
| | | | | 711/155 |
| 2014/0052953 | A1* | 2/2014 | Ben-Tsion | G06F 3/0605 |
| | | | | 711/172 |
| 2014/0278808 | A1* | 9/2014 | Iyoob | G06Q 30/0206 |
| | | | | 705/7.35 |
| 2014/0279201 | A1* | 9/2014 | Iyoob | G06Q 30/0631 |
| | | | | 705/26.7 |
| 2014/0279966 | A1* | 9/2014 | Rajpal | G06F 17/30091 |
| | | | | 707/693 |
| 2014/0289386 | A1* | 9/2014 | Vatto | H04L 41/5067 |
| | | | | 709/223 |
| 2014/0317166 | A1* | 10/2014 | Iyoob | G06Q 30/0631 |
| | | | | 709/201 |
| 2015/0269000 | A1* | 9/2015 | Alexeev | G06F 3/0631 |
| | | | | 718/104 |

OTHER PUBLICATIONS

"EMC VNX Virtual Provisioning" EMC, Dec. 2013.*
Zhu, Qian, and Gagan Agrawal. "Resource provisioning with budget constraints for adaptive applications in cloud environments." Proceedings of the 19th ACM International Symposium on High Performance Distributed Computing. ACM, 2010.*
Rajaraman, Anand, and Jeffrey David Ullman. "Recommendation systems." Mining of Massive Datasets (2011): 307-340.*
"EMC Storage Configuration Advisor" EMC, 2011.*

* cited by examiner

150

- 4 processing engines
- 2 TB of cache
- 16 x 300GB of Flash Drives (RAID-5)
- 80 x 600GB of SAS 15k RPM drives (RAID-1)
- 100 x 2TB SATA 7.2k RPM Drives (RAID-6)

152

- 4 processing engines
- 4 TB of cache
- 16 x 300GB of Flash Drives (RAID-5)
- 40 x 600GB of SAS 15k RPM drives (RAID-1)
- 112 x 2TB SATA 7.2k RPM Drives (RAID-6)

154

- 4 processing engines
- 4 TB of cache
- 16 x 400GB of Flash Drives (RAID-5)
- 248 x 1TB SAS 15k RPM Drives (RAID-6)

156

- 4 processing engines
- 4 TB of cache
- 24 x 400GB of Flash Drives (RAID-5)
- 124 x 2TB SAS 15k RPM Drives (RAID-6)

RECOMMENDATION SYSTEM AND METHOD

TECHNICAL FIELD

This disclosure relates to recommendation systems and, more particularly, to recommendation systems for identifying a recommended data storage array based upon various criteria.

BACKGROUND

Storing and safeguarding electronic content is of paramount importance in modern business. Accordingly, large storage systems may be utilized to protect such electronic content. As would be expected, such large storage systems may be quite expensive and may be configured to include one or more enhanced features (and various levels thereof). Accordingly, the ability to properly size and configure these systems is highly important, as system that are configured at too low a performance level may not provide the desired/required level of performance; while systems that are configured at too high a performance level may be prohibitively expensive.

SUMMARY OF DISCLOSURE

In one implementation, a computer-implemented method is executed on a computing device. The computer-implemented method includes defining one or more computing system requirements for a desired data storage array. One or more design criteria are defined for the desired data storage array. At least one recommended data storage array is identified for the desired data storage array based, at least in part, upon the one or more computing system requirements and the one or more design criteria.

One or more of the following features may be included. Defining one or more computing system requirements for desired data storage array may include one or more of: manually defining one or more computing system requirements for desired data storage array; and automatically defining one or more computing system requirements for desired data storage array. Identifying at least one recommended data storage array for the desired data storage array may include identifying one or more candidate data storage arrays based, at least in part, upon the one or more computing system requirements. Identifying at least one recommended data storage array for the desired data storage array further may include selecting the at least one recommended data storage array from the one or more candidate data storage arrays based, at least in part, upon the one or more design criteria. The one or more design criteria for the desired data storage array may include one or more of: a binary design criterion for the desired data storage array; and a weighted design criterion for the desired data storage array. Selecting the at least one recommended data storage array from the one or more candidate data storage arrays may include assigning a weighted dollar value to the weighted design criterion. Selecting the at least one recommended data storage array from the one or more candidate data storage arrays may further include comparing the weighted dollar value for the weighted design criteria to an upgrade cost associated with weighted design criterion.

In another implementation, a computer program product resides on a computer readable medium that has a plurality of instructions stored on it. When executed by a processor, the instructions cause the processor to perform operations including defining one or more computing system requirements for a desired data storage array. One or more design criteria are defined for the desired data storage array. At least one recommended data storage array is identified for the desired data storage array based, at least in part, upon the one or more computing system requirements and the one or more design criteria.

One or more of the following features may be included. Defining one or more computing system requirements for desired data storage array may include one or more of: manually defining one or more computing system requirements for desired data storage array; and automatically defining one or more computing system requirements for desired data storage array. Identifying at least one recommended data storage array for the desired data storage array may include identifying one or more candidate data storage arrays based, at least in part, upon the one or more computing system requirements. Identifying at least one recommended data storage array for the desired data storage array further may include selecting the at least one recommended data storage array from the one or more candidate data storage arrays based, at least in part, upon the one or more design criteria. The one or more design criteria for the desired data storage array may include one or more of: a binary design criterion for the desired data storage array; and a weighted design criterion for the desired data storage array. Selecting the at least one recommended data storage array from the one or more candidate data storage arrays may include assigning a weighted dollar value to the weighted design criterion. Selecting the at least one recommended data storage array from the one or more candidate data storage arrays may further include comparing the weighted dollar value for the weighted design criteria to an upgrade cost associated with weighted design criterion.

In another implementation, a computing system includes at least one processor and at least one memory architecture coupled with the at least one processor, wherein the computing system is configured to perform operations including defining one or more computing system requirements for a desired data storage array. One or more design criteria are defined for the desired data storage array. At least one recommended data storage array is identified for the desired data storage array based, at least in part, upon the one or more computing system requirements and the one or more design criteria.

One or more of the following features may be included. Defining one or more computing system requirements for desired data storage array may include one or more of: manually defining one or more computing system requirements for desired data storage array; and automatically defining one or more computing system requirements for desired data storage array. Identifying at least one recommended data storage array for the desired data storage array may include identifying one or more candidate data storage arrays based, at least in part, upon the one or more computing system requirements. Identifying at least one recommended data storage array for the desired data storage array further may include selecting the at least one recommended data storage array from the one or more candidate data storage arrays based, at least in part, upon the one or more design criteria. The one or more design criteria for the desired data storage array may include one or more of: a binary design criterion for the desired data storage array; and a weighted design criterion for the desired data storage array. Selecting the at least one recommended data storage array from the one or more candidate data storage arrays may include assigning a weighted dollar value to the weighted design criterion. Selecting the at least one recommended data storage array from the one or more candidate data storage arrays may further include comparing the weighted dollar value for the weighted design criteria to an upgrade cost associated with weighted design criterion.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of four candidate data storage systems identified by the recommendation process of FIG. 1.

Like reference symbols in the various drawings indicate like elements.

DETAILED DESCRIPTION OF THE PREFERRED EMBODIMENTS

Figure 1:
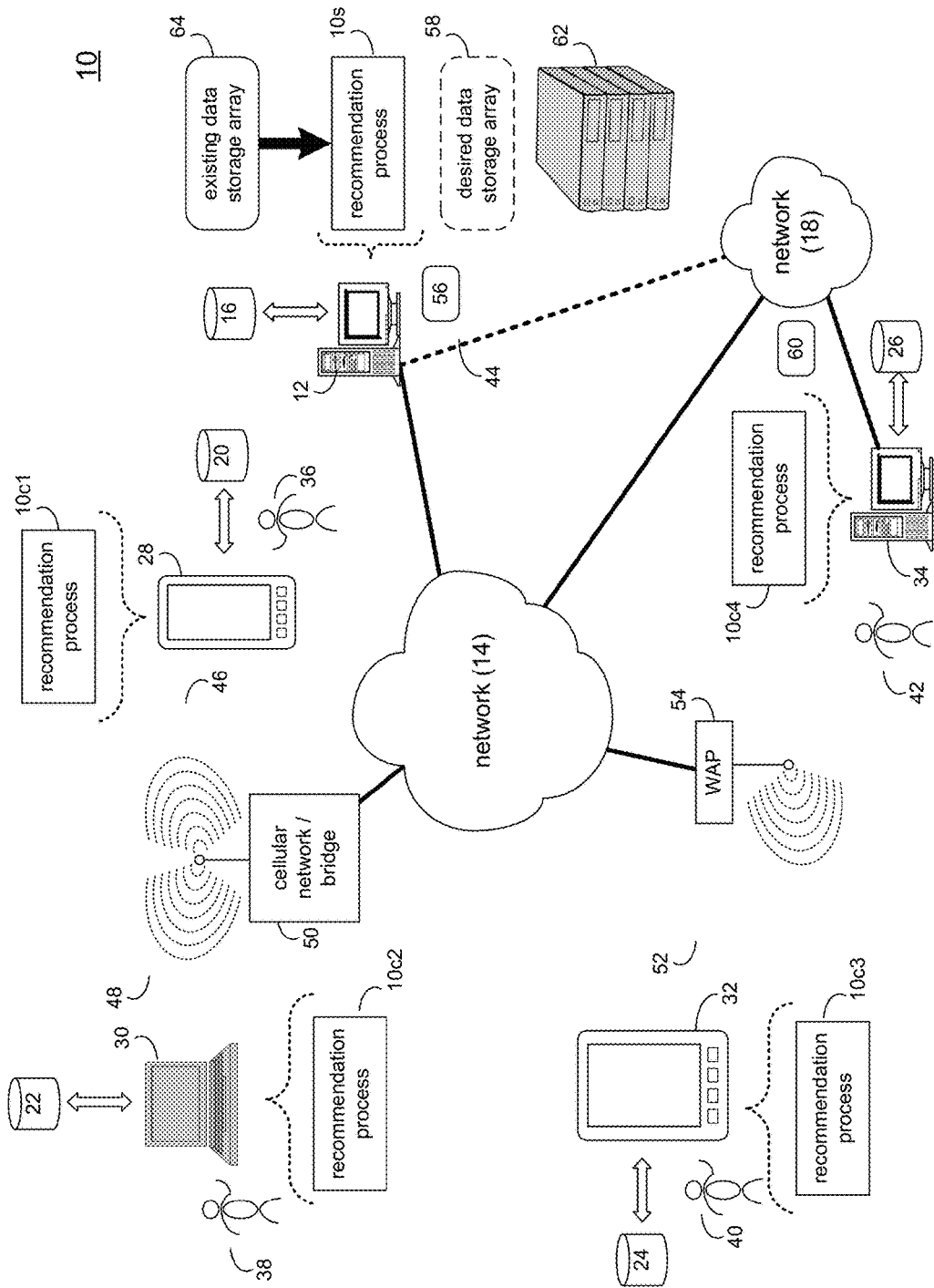
FIG. 1 is a diagrammatic view of a recommendation process coupled to a distributed computing network.

System Overview:

In FIG. 1, there is shown recommendation process 10. As will be discussed below in greater detail, recommendation process 10 may be configured to analyze one or more computing system requirements and one or more design criteria to identify a recommended data storage array.

Recommendation process 10 may be implemented as a server-side process, a client-side process, or a hybrid server-side/client-side process. For example, recommendation process 10 may be implemented as a purely server-side process via recommendation process 10s. Alternatively, recommendation process 10 may be implemented as a purely client-side process via one or more of recommendation process 10c1, recommendation process 10c2, recommendation process 10c3, and recommendation process 10c4. Alternatively still, recommendation process 10 may be implemented as a hybrid server-side/client-side process via recommendation process 10s in combination with one or more of recommendation process 10c1, recommendation process 10c2, recommendation process 10c3, and recommendation process 10c4. Accordingly, recommendation process 10 as used in this disclosure may include any combination of recommendation process 10s, recommendation process 10c1, recommendation process 10c2, recommendation process 10c3, and recommendation process 10c4.

Recommendation process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of recommendation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of recommendation processes 10c1, 10c2, 10c3, 10c4 may include but are not limited to a web browser, a game console user interface, a social network user interface, or a specialized application. The instruction sets and subroutines of recommendation processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, smartphone 28, laptop computer 30, tablet computer 32, personal computer 34, a personal digital assistant (not shown), a notebook computer (not shown), a server computer (not shown), a smart television (not shown), a gaming console (not shown), and a dedicated network device (not shown). Client electronic devices 28, 30, 32, 34 may each execute an operating system.

Users 36, 38, 40, 42 may access recommendation process 10 directly through network 14 or through secondary network 18. Further, recommendation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, smartphone 28 and laptop computer 30 are shown wirelessly coupled to network 14 via wireless communication channels 46, 48 (respectively) established between smartphone 28, laptop computer 30 (respectively) and cellular network/bridge 50, which is shown directly coupled to network 14. Further, tablet computer 32 is shown wirelessly coupled to network 14 via wireless communication channel 52 established between tablet computer 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between tablet computer 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Recommendation Process:

As discussed above, recommendation process 10 may be configured to analyze one or more computing system requirements and one or more design criteria to identify a recommended data storage array.

Figure 2:
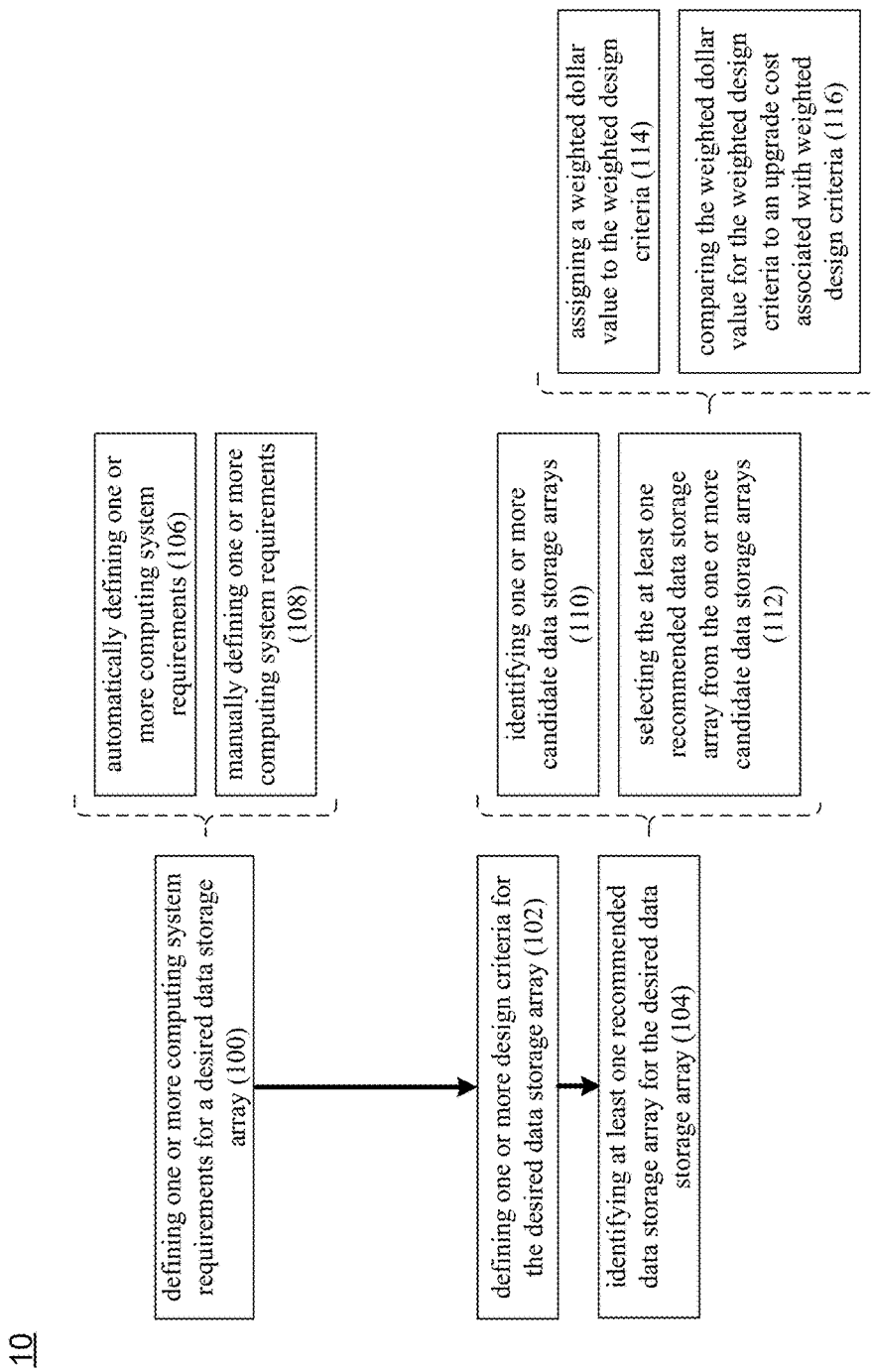
FIG. 2 is a flow chart of one implementation of the recommendation process of FIG. 1.

Referring also to FIG. 2 and as will be discussed below in greater detail, recommendation process 10 may define 100 one or more computing system requirements (e.g., computing requirements 56) for a desired data storage array (e.g., desired data storage array 58) and may define 102 one or more design criteria (e.g., design criteria 60) for desired data storage array 58. And, based (at least in part) upon the one or more computing system requirements (e.g., computing requirements 56) and the one or more design criteria (e.g., design criteria 60), recommendation process 10 may identify 104 at least one recommended data storage array (e.g., recommended data storage array 62) for desired data storage array 58

Assume for the following example that user 42 is interested in desired data storage array 58 and would like to receive a recommendation concerning desired data storage array 58 (in the form of recommended data storage array 62) and utilizes personal computer 34 to access recommendation process 10 to obtain such a recommendation. For example, user 42 may be a customer who is interested in purchasing desired data storage array 58. Alternatively/additionally, user 42 may be a sales consultant that is employed by/works for/works with a company that sells data storage arrays.

As discussed above, recommendation process 10 may be implemented as a server-side process, a client-side process, or a hybrid server-side/client-side process. Accordingly and for this example, recommendation process 10 may be implemented: as a purely server-side process via recommendation process 10s; as a purely client-side process via recommendation process 10c4; or as a hybrid server-side/client-side process via recommendation process 10s in combination with recommendation process 10c4.

As discussed above, recommendation process 10 may define 100 one or more computing system requirements (e.g., computing system requirements 56) for desired data storage array 58. Concerning computing system requirements 56, these computing requirements may define the overall required performance of desired data storage array 58. Examples of computing system requirements 56 may include but are not limited to one or more of the following:
  IOPS: Computing system requirements 56 may define the IOPS (i.e., Input/output Operations Per Second) required for desired data storage array 58. As is known in the art, IOPS is a common performance measurement that may be used in the computer industry to benchmark computer storage systems (e.g., hard disk drives, solid state drives, storage area networks (SAN), network attached storage (NAS) devices, and data storage arrays.
  Response Time: Computing system requirements 56 may define the desired response time of desired data storage array 58 (e.g., when responding to a data read request and/or a data write request).
  Storage Capacity: Computing requirements 56 may define a minimum required storage capacity (e.g., in terabytes or petabytes) for desired data storage array 58.
  Enterprise Applications: Computing requirements 56 may define any enterprise applications that may be running (or needs to be run) on desired data storage array 58. Accordingly, if e.g., desired data storage array 58 needs to run an enterprise-level database application, computing requirements 56 may define/include the minimum requirements of (in this example) the enterprise-level database application.
  Cost: Computing requirements 56 may define the maximum amount that the customer (e.g., user 42) is willing to pay for desired data storage array 58.
  Size: Computing requirements 56 may define the maximum size (e.g., in rack space, floor space, etc.) that the customer (e.g., user 42) has available for desired data storage array 58.
  Power: Computing requirements 56 may define the maximum power (e.g., in kilowatts) that the customer (e.g., user 42) has available for desired data storage array 58.

When defining 100 computing system requirements 56 for desired data storage array 58, recommendation process 10 may automatically define 106 some or all of computing system requirements 56 for desired data storage array 58 and/or may manually define 108 some or all of computing system requirements 56 for desired data storage array 58.

For example, if the customer who is interested in desired data storage array 58 (e.g., user 42) has an existing data storage array (e.g., existing data storage array 64), recommendation process 10 may interface with (or a portion of recommendation process 10 may be deployed upon) existing data storage array 64. Accordingly, recommendation process 10 may execute various diagnostic tools on existing data storage array 64 to automatically define 106 some or all of computing system requirements 56 for desired data storage array 58. For example, recommendation process 10 may be configured to automatically define 106 the IOPS, Response Time and Enterprise Applications portions of computing system requirements 56.

Alternatively and/or in the event that existing data storage array 64 does not exist (or is not readily accessible), the customer who is interested in desired data storage array 56 (e.g., user 42) may manually define 108 some or all of computing system requirements 56 for desired data storage array 58. For example, recommendation process 10 may be configured to allow the customer (e.g., user 42) to manually define 108 (via e.g., a graphical user interface, not shown) the Storage Capacity, Cost, Size and Power portions of computing system requirements 56.

Accordingly and as used in this disclosure, some or all of computing system requirements 56 may define a baseline for desired data storage array 58, wherein the baseline defines the minimum acceptable level of performance/capacity required from desired data storage array 58.

As discussed above, recommendation process 10 may define 102 one or more design criteria (e.g., design criteria 60) for desired data storage array 58. Examples of such design criteria (e.g., design criteria 60) may include but are not limited to one or more of the following:
  Power Consumption: How efficient would the customer (e.g., user 42) like desired data storage array 58 to be? For example, a higher level of energy efficiency may be achievable by utilizing more expensive SSD drives.
  Space: How important is it to the customer (e.g., user 42) that desired data storage array 58 fit within the above-defined space (e.g., in rack space, floor space, etc.)?
  Ease of Upgrade: Does the customer (e.g., user 42) want to be able to upgrade their system (e.g., adding storage capacity, adding processing capacity, etc.) in the future? For example, a higher level of expandability may be achievable by utilizing a larger rack or a smaller quantity of larger drives, which may increase cost.
  Best Practice: Examples of which may include but are not limited to:
    a. Minimum Percentages: For example, the customer (e.g., user 42) may want at least a certain percentage of some specific technology (e.g., at least 10% SSD drives) to be included within desired data storage array 58.

b. Balance: For example, the customer (e.g., user 42) may want desired data storage array 58 to be balanced with respect to e.g., cache or disk distribution. Specifically, balance may concern the number of SSD drives that are supported by each CPU core. For example, how important it is to the customer that all of the CPU cores have the same number of SSD drives behind them? Consider a system in which e.g., eleven SSD drives may achieve the performance goals desired by the customer. However, if the system includes eight CPU cores in the backend, then three of those CPU cores will be handling two SSD drives and five of those CPUs will be handling only one SSD drive. Since SSD drives get most of the backend I/O activity, three of the CPU cores will be twice as busy as the other five CPU cores. To avoid this situation, the customer may want to add five additional SSD drives to guarantee "balance". However, this may make the system more expensive, and the weight assigned to the balance design criteria may allow a determination to be made. Similar balancing methodologies and considerations may be applied concerning caching systems.

Risk: What level of performance certainty does the customer (e.g., user 42) want with respect to desired data storage array 58. For example, does the customer (e.g., user 42) want 100% of the requested performance (e.g., as defined by IOPS, response time, etc.) 100% of the time? Or can they accept 90% of the time if that can save them $100,000?

Tiers: Does the customer (e.g., user 42) prefer e.g., two tier storage systems or three tier storage systems for desired data storage array 58. For example, different tiers of storage capacity may be defined using SSD drives (highest expense tier), 15,000 rpm rotating drives (mid-level expense tier), and 7,200 rpm rotating drives (lowest expense tier). A two tier system may use only SSD and 15,000 rpm rotating drives, which is more expensive but provides a higher level of performance and consumes less power. A three tier system may use SSD drives, 15,000 rpm rotating drives, and 7,200 rpm rotating drives, which would be less expensive but provides a lower level of performance and consumes more power.

Headroom: Examples of headroom may include but are not limited to the following:

a. IOPS Growth: Does the customer (e.g., user 42) want to be able to upgrade their IOPS capacity in the future? For example, by using a smaller quantity of higher capacity processing engines, future IOPS growth may be achievable without e.g., e.g., purchasing additional racks.

b. Capacity Growth: Does the customer (e.g., user 42) want to be able to upgrade their storage capacity in the future? For example, by using a smaller quantity of higher capacity drives, future capacity growth may be achievable without e.g., e.g., purchasing additional racks.

The above-described design criteria (e.g., design criteria 60) for desired data storage array 58 may include binary design criteria for desired data storage array 58 and/or weighted design criteria for desired data storage array 58.

For example, one or more of the above-described design criteria (e.g., design criteria 60) may be defined in a binary fashion (i.e., as a binary design criterion). Therefore, the customer (e.g., user 42) may define a two-tier storage system as a requirement (regardless of the incremental cost increase associated with utilizing a two-tier storage system when compared to a three-tier storage system). Alternatively, one or more of the above-described design criteria (e.g., design criteria 60) may be defined in a weighted fashion (i.e., as a weighted design criterion). These weights may be manually assigned by the customer (e.g., user 42) or automatically assigned by recommendation process 10. For example, recommendation process 10 may be configured to allow the customer (e.g., user 42) to manually assign weights to one or more of the above-described design criteria 60 via e.g., a graphical user interface (not shown). Alternatively, recommendation process 10 may be configured to automatically assign default weights to one or more of the above-described design criteria 60

Accordingly and assuming that weights may be assigned within a range of 0-100, where a weight of "0" is essentially a binary zero and a weight of "100" is essentially a binary one. Accordingly, weights in the range of 1-99 are neither binary zeros or binary ones. Therefore, the closer the weight is to "99", the more important this design criterion is to the customer (e.g., user 42); and the closer the weight is to "1", the less important this design criterion is to the customer (e.g., user 42). Therefore, if the customer (e.g., user 42) defined a weight of "90" for "Power Consumption" and a weight of "20" to "Capacity Growth", it is substantially more important that desired data storage array 58 be highly efficient concerning power consumption than desired data storage array 58 be expandable concerning storage capacity.

When identifying 104 at least one recommended data storage array (e.g., recommended data storage array 62) for desired data storage array 58, recommendation process 10 may identify 110 one or more candidate data storage arrays based, at least in part, upon the one or more computing system requirements (e.g., computing system requirements 56).

For example and referring also to FIG. 3, assume for this example that recommendation process 10 identifies 110 four candidate data storage arrays (e.g., candidate data storage systems 150, 152, 154, 156) based, at least in part, upon computing system requirements 56. While recommendation process 10 is described as identifying 110 four candidate data storage arrays, this is for illustrative purposes only and is not intended to be a limitation of this disclosure, as other configurations are possible. For example, the quantity of candidate data storage arrays identified 110 by recommendation process 10 may be increased or decreased depending upon e.g., design criteria, customer need, etc.

For example, assume that computing system requirements 56 defined a level of IOPS that mandated four processing engines, at least two terabytes of cache, at least four terabytes of SSD storage and at least one-quarter petabyte of total storage. Accordingly, candidate data storage systems 150, 152, 154, 156 identified 110 by recommendation process 10 may define four systems that meet the system requirements defined within computing system requirements 56. As can be seen upon reviewing these systems, candidate data storage systems 150, 152, 154, 156 may meet (or exceed) the requirements of computing system requirements 56 in various ways. For example, candidate data storage systems 150, 152 include three-tier storage systems, while candidate data storage systems 154, 156 include two-tier storage systems. Further, candidate data storage system 150 includes two terabytes of cache, while candidate data storage systems 152, 154, 156 each include four terabytes of cache.

When identifying 104 at least one recommended data storage array (e.g., recommended data storage array 62) for desired data storage array 58, recommendation process 10 may select 112 the at least one recommended data storage array (e.g., recommended data storage array 62) from the one or more candidate data storage arrays (e.g., candidate data storage systems 150, 152, 154, 156) based, at least in part, upon the one or more design criteria (e.g., design criteria 60).

As discussed above, the above-described design criteria (e.g., design criteria 60) for desired data storage array 58 may include a binary design criterion for desired data storage array 58 and/or a weighted design criterion for desired data storage array 58. And recommendation process 10 may utilize these binary design criterion and/or weighted design criterion when selecting 112 the at least one recommended data storage array (e.g., recommended data storage array 62) from the one or more candidate data storage arrays (e.g., candidate data storage systems 150, 152, 154, 156).

For example, when selecting 112 the at least one recommended data storage array (e.g., recommended data storage array 62) from the one or more candidate data storage arrays (e.g., candidate data storage systems 150, 152, 154, 156), recommendation process 10 may assign 114 a weighted dollar value to the weighted design criteria and may compare 116 this weighted dollar value for the weighted design criteria to an upgrade cost associated with weighted design criteria.

For example, assume that the customer (e.g., user 42) assigned a weight of "20" to having a two-tier storage system (i.e., the more expensive storage system) versus a three-tier storage system (i.e., the less expensive storage system). Accordingly, user 42 has a comparatively low interest in having a two-tier storage system . . . but none the less are still interested. Assume that the cost of a three-tier storage system meeting the requirements defined within computing system requirements 56 has a cost of $1,000,000. Since the weight assigned to "Tier" was "20", recommendation process 10 may assign 114 a weighted dollar value of $200,000 (20% of $1,000,000) to the weighted design criterion (i.e., "Tier" having a weight of "20"). Accordingly, if the cost of a two-tier storage system meeting the requirements defined within computing system requirements 56 is e.g., $1,100,000, when comparing 116 this weighted dollar value ($200,000) for the weighted design criterion (i.e., "Tier" having a weight of "20") to the upgrade cost ($100, 000) associated with weighted design criteria, recommendation process 10 may determine that the differential cost of the upgrade ($100,000) is less than the weighted dollar value ($200,000) and may recommend one or more two-tier system (chosen from candidate data storage systems 150, 152, 154, 156).

However, if the cost of a two-tier storage system meeting the requirements defined within computing system requirements 56 is $1,300,000, when comparing 116 this weighted dollar value ($200,000) for the weighted design criterion (i.e., "Tier" having a weight of "20") to the upgrade cost ($300,000) associated with weighted design criteria, recommendation process 10 may determine that the differential cost of the upgrade ($300,000) is greater than the weighted dollar value ($200,000) and may not recommend any two-tier systems from candidate data storage systems 150, 152, 154, 156.

While the above-described example concerns a weighted "Tier" design criterion, this is for illustrative purposes only and is not intended to be a limitation of this disclosure. Accordingly, when assigning 114 a weighted dollar value to the weighted design criterion and comparing 116 this weighted dollar value to an upgrade cost, this methodology may be applied to any of the design criterion, such as: Power Consumption, Space, Ease of Upgrade, Best Practice (Minimum Percentages or Balance), Risk, and Headroom (IOPS Growth or Capacity Growth).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wire-line, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device, the computer-implemented method comprising:
    defining one or more computing system requirements for a desired data storage array;
    defining one or more design criteria for the desired data storage array, wherein the one or more design criteria for the desired data storage array includes a weighted design criterion for the desired data storage array defining a level of importance of the one or more design criteria for the desired data storage array, wherein each weighted design criterion includes an automatically assigned default weight;
    identifying one or more candidate data storage arrays based, at least in part, upon the one or more computing system requirements;
    identifying at least one recommended data storage array for the desired data storage array from the one or more candidate data storage arrays based, at least in part, upon the one or more design criteria; and
    automatically selecting the at least one recommended data storage array from the one or more candidate data storage arrays based, at least in part, upon the one or more design criteria.

2. The computer-implemented method of claim 1 wherein defining one or more computing system requirements for desired data storage array includes one or more of:
    manually defining one or more computing system requirements for the desired data storage array; and
    automatically defining one or more computing system requirements the for desired data storage array.

3. The computer-implemented method of claim 1 wherein the one or more design criteria for the desired data storage array includes a binary design criterion for the desired data storage array.

4. The computer-implemented method of claim 3 wherein selecting the at least one recommended data storage array from the one or more candidate data storage arrays includes:
    assigning a weighted monetary value to the weighted design criterion.

5. The computer-implemented method of claim 1 wherein selecting the at least one recommended data storage array from the one or more candidate data storage arrays further includes:
    comparing the weighted monetary value for the weighted design criteria to an upgrade cost associated with weighted design criterion.

6. A computer program product residing on a non-transitory computer readable medium having a plurality of instructions stored thereon which, when executed by a processor, cause the processor to perform operations comprising:

defining one or more computing system requirements for a desired data storage array;

defining one or more design criteria for the desired data storage array, wherein the one or more design criteria for the desired data storage array includes a weighted design criterion for the desired data storage array defining a level of importance of the one or more design criteria for the desired data storage array, wherein each weighted design criterion includes an automatically assigned default weight;

identifying one or more candidate data storage arrays based, at least in part, upon the one or more computing system requirements;

identifying at least one recommended data storage array for the desired data storage array from the one or more candidate data storage arrays based, at least in part, upon the one or more design criteria; and automatically selecting the at least one recommended data storage array from the one or more candidate data storage arrays based, at least in part, upon the one or more design criteria.

7. The computer program product of claim 6 wherein defining one or more computing system requirements for desired data storage array includes instructions for one or more of:

manually defining one or more computing system requirements for the desired data storage array; and automatically defining one or more computing system requirements the for desired data storage array.

8. The computer program product of claim 6 wherein the one or more design criteria for the desired data storage array includes a binary design criterion for the desired data storage array.

9. The computer program product of claim 8 wherein selecting the at least one recommended data storage array from the one or more candidate data storage arrays includes instructions for:

assigning a weighted monetary value to the weighted design criterion.

10. The computer program product of claim 9 wherein selecting the at least one recommended data storage array from the one or more candidate data storage arrays further includes instructions for:

comparing the weighted monetary value for the weighted design criteria to an upgrade cost associated with weighted design criterion.

11. A computing system including a processor and memory configured to perform operations comprising:

defining, by the processor, one or more computing system requirements for a desired data storage array;

defining, by the processor, one or more design criteria for the desired data storage array, wherein the one or more design criteria for the desired data storage array includes a weighted design criterion for the desired data storage array defining a level of importance of the one or more design criteria for the desired data storage array, wherein each weighted design criterion includes an automatically assigned default weight;

identifying one or more candidate data storage arrays based, at least in part, upon the one or more computing system requirements;

identifying, by the processor, at least one recommended data storage array for the desired data storage array from the one or more candidate data storage arrays based, at least in part, upon the one or more design criteria; and automatically selecting the at least one recommended data storage array from the one or more candidate data storage arrays based, at least in part, upon the one or more design criteria.

12. The computing system of claim 11 wherein defining one or more computing system requirements for desired data storage array includes one or more of:

manually defining one or more computing system requirements for the desired data storage array; and automatically defining one or more computing system requirements the for desired data storage array.

13. The computing system of claim 11 wherein the one or more design criteria for the desired data storage array includes a binary design criterion for the desired data storage array.

14. The computing system of claim 13 wherein selecting the at least one recommended data storage array from the one or more candidate data storage arrays includes:

assigning a weighted monetary value to the weighted design criterion.

15. The computing system of claim 14 wherein selecting the at least one recommended data storage array from the one or more candidate data storage arrays further includes:

comparing the weighted monetary value for the weighted design criteria to an upgrade cost associated with weighted design criterion.

* * * * *